INVENTOR.
ROBERT L. WILLIAMS
BY
ATTORNEY

INVENTOR.
ROBERT L. WILLIAMS
BY Ronald W Mayes
ATTORNEY

United States Patent Office 3,255,708
Patented June 14, 1966

3,255,708
EJECTOR PUMP
Robert L. Williams, Wichita, Kans., assignor to The Boeing Company, Wichita, Kans., a corporation of Delaware
Filed Jan. 2, 1964, Ser. No. 335,066
5 Claims. (Cl. 103—258)

This invention relates to improvements in ejector pumps. More particularly, it relates to ejector pumps having an eductor and a nozzle.

Heretofore, there has been difficulty experienced in providing fluid feeding systems that are capable of completely pumping or more particularly using all of the liquid in a reservoir. In the aircraft art one of the basic problems has been providing a fuel feeding system that is lightweight, efficient, economical to manufacture and use, and in which substantially all of the fuel in a fuel tank can be utilized. In high performance military aircraft, other types of pumps including centrifugal pumps have been used in an effort to provide a pumping system by which all the fuel can be pumped or otherwise removed from a reservoir or fuel tank. Conventional centrifugal pumps are often required to be disposed in a relatively deep well or recess in a liquid fuel tank because the pump cannot remove the last few inches of fuel from the tank at the design pressure.

Previously known ejector pumps, often referred to as jet pumps, are available in various sizes and shapes; however when the large size eductors were used it was desirable to have more flexibility in the pump envelope design. If a plurality of relatively small ejector pumps or eductors were used, the installation, maintenance, and the like were more complex.

It is therefore an object of this invention to provide a new and improved ejector pump suitable for use in the fuel tank of a high performance aircraft and for providing a maximum of flexibility in envelope design and simplification of installation, thus reducing fire hazards and other problems attendant with this type of aircraft system.

Another object of this invention is the provision of a novel ejector pump comprising a plurality of eductors with corresponding nozzles operatively positioned therein.

A still further object of this invention is the provision of a new and improved ejector pump comprising multiple nozzles and eductors wherein a housing for the eductors converges inwardly or necks in at a uniform rate and in such a manner that the cross section perpendicular to the flow axis of the eductor at any point thereon is of constant area.

Yet another object of this invention is the provision of an ejector pump, comprising a plurality of relatively small, coplanar, and aligned ejector pumps, having the capacity to withdraw substantially all of the fluid from a tank when the eductors thereof are substantially coplanar with the bottom of the tank and preferably disposed above a half inch deep well.

The invention further resides in certain novel features of construction, combinations, and arrangements of parts and further objects and advantages of the invention will be apparent to those skilled in the art to which it pertains from the following description of the present preferred embodiment thereof described with reference to the accompanying drawings, which form a part of this specification, wherein the same reference numerals indicate corresponding parts throughout the several views, and in which.

Figure 1:
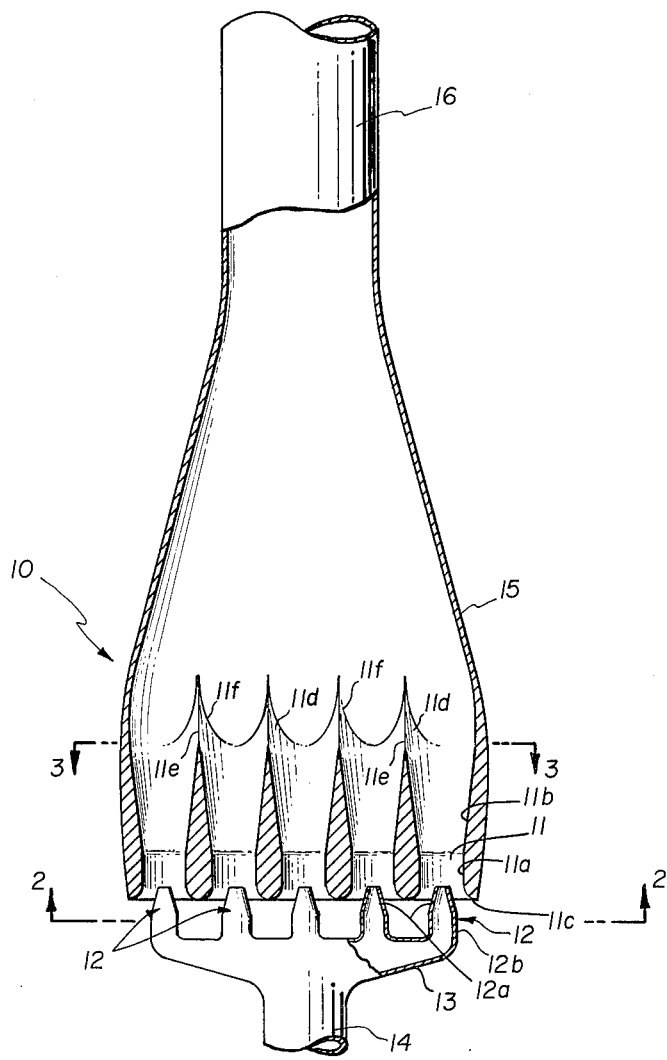
FIG. 1 shows an ejector pump embodying the invention with parts broken away and in section to show certain details thereof.
Figure 2:
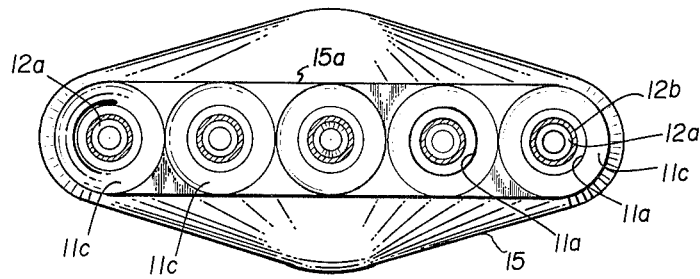
FIG. 2 is a cross sectional view along line 2—2 in FIG. 1.
Figure 3:
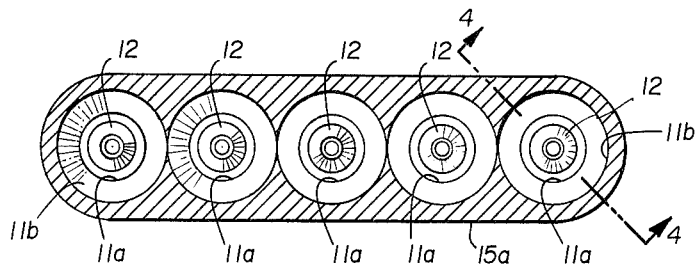
FIG. 3 is a cross sectional view along line 3—3 in FIG. 1.
Figure 4:
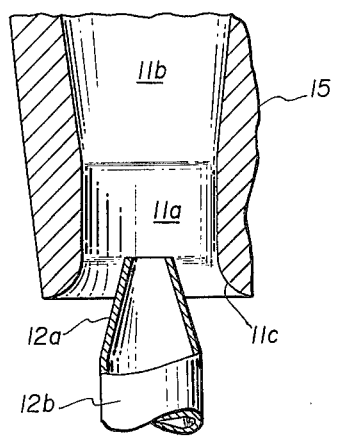
FIG. 4 is an enlarged fragmentary sectional view of one of the multiple eductors and nozzles along line 4—4 in FIG. 3.

It is to be understood that the invention is not limited to the details of construction and the arrangements of parts shown in the drawings and hereinafter described in detail, but is capable of being otherwise embodied and of being practiced and carried out in various ways. It is to be further understood that the terminology employed herein is for the purpose of description and there is no intention to herein limit the invention beyond the requirements of the prior art.

Referring to FIG. 1, the ejector pump embodying the invention is indicated generally by the reference numeral 10. The ejector pump comprises a plurality of or multiple eductors 11 each having a nozzle 12 positioned therein. Each of the nozzles 12 is preferably identical in construction and projects above a manifold 13 from an input line 14. The manifold 13, the intake line 14, and the nozzles 12 are all preferably comprised of a molded sheet metal structure or metal casting. Each of the nozzles 12 terminates in a frusto-conical structure 12a from a cylindrical structure 12b connected to the manifold 13. Preferably the manifold 13 has five nozzles 12 formed therein that are parallelly aligned and coplanar. Each of the nozzles 12 controls and directs the flow therefrom of liquid jets.

The multiple eductors 11 are connected together into an integral structure at the intake end of a funnel, duct or manifold housing 15. The axes of each of the eductors 11 are coplanar and parallel as well as coaxial with each of their corresponding respective nozzles 12. Each eductor 11 has a cylindrical nozzle throat portion 11a and a diverging frusto-conically flared skirt or expansion chamber portion 11b. The expansion chamber 11b is coaxial with its corresponding nozzle throat 11a. The chamber 11b tapers or diverges outwardly at a total angle of approximately ten to fifteen degrees. The expansion chamber 11b, as pointed out, is frusto-conically shaped. However, a faired portion 11d extends beyond the chamber 11b for providing a smooth transition between the chambers 11b of the fluid passages in the eductor 11 and the housing 15. As seen in FIG. 1, the fairing 11d has parallel ridges 11e and hyperbolically-shaped contours 11f since the fairings 11d are substantially cylindrical. The eductor 11 has an intake lip or duct portion 11c of a relatively small radius of approximately two-thirds the radius of the eductor throat 11a. Lip portion 11c is circular and coaxial with the throat 11a and the expansion chamber 11b. The tip of each nozzle 12 lies coplanar with the outer end of cylindrical throat portion 11a for maximum operating efficiency.

As pointed out, each of the eductors 11 has a flow axis that is parallel and coplanar. Each subassembly of the nozzles 12 and eductors 11 is equally spaced from an adjacent nozzle and eductor subassembly. Preferably the expansion chamber 11b of each eductor 11 extends for an axial length of approximately two to three times the axial length of the cylindrical throat portion 11a. Each lip 11c has an axial length of approximately one-third of the axial length of a corresponding throat 11a.

The eductor housing 15 has a manifold shape for accommodating flow at a substantially uniform velocity therethrough with very little accompanying resistance to fluid flow. Every cross section of the manifold housing 15 taken along planes normal to the flow axis of the housing 15 has substantially equal, uniform, or constant cross sectional areas. Accordingly, minimum opportunity is presented for the relatively smooth fluid flow in the eductor housing 15 to be disturbed due to friction and turbulence because of the configuration of the eductor housing 15. Preferably as shown in FIG. 1 the side walls of the housing 15 have a relatively constant inward taper from the intake end thereof of approximately twenty degrees.

The housing 15 is connected to a tubular conduit 16 having a cross sectional area approximately the same as the cross sectional area of the housing 15. Fluid supplied to the nozzle 12 via the conduit 14 expands into the eductor throats 11a and the expansion chambers 11b and at the same time causes the induction of additional fluid past the lips 11c of the eductors 11 and surrounding the nozzle tips 12a. The fluid supplied through nozzles 12 and the fluid inducted into and through the housing 15 is exhausted or emitted through the tube 16.

It will be understood that this invention can be modified to adapt it to various circumstances and conditions, and it is accordingly desired to comprehend within the purview of this invention such modifications as may be considered to fall within the scope of the appended claims.

I claim:
1. An ejector pump comprising, ejector means, and eductor means forming a plurality of coplanar and parallel and equally spaced fluid passage means and common exhaust duct means therein, said fluid passage means each having radiused lip fluid inlet means and cylindrical throat means and frusto-conically flared fluid expansion chamber means, said radiused lip fluid inlet means being coaxial and contiguous with and connected to said cylindrical throat means, said cylindrical throat means being coaxial and contiguous with and connected to said frusto-conically flared fluid expansion chamber means, said common exhaust duct means of said eductor means being contiguous with and connected to said fluid passage means, said common exhaust duct means forming a fluid flow path parallel to and coplanar with said fluid passage means, said common exhaust duct means having a substantially constant area cross-section normal to and along said fluid flow path, said common exhaust duct means having an elongated configuration with parallel sides and arcuate ends in normal cross-section at the intake end thereof and having a circular configuration at the exit end thereof, said ejector means having tubular fluid conduit means and manifold means and a plurality of nozzle means, said fluid conduit means being connected to said manifold means for conducting fluid to said manifold means, said plurality of nozzle means being parallel and coplanar and connected to said manifold means, one of said nozzle means being coaxially aligned with and disposed in each one of said plurality of eductor fluid passage means, and the tip of each said nozzle means extending the length of said radiused lip fluid inlet means thereof and terminating at the beginning of said cylindrical throat means thereof.

2. An eductor comprising, means forming a plurality of coplanar and parallel and equally spaced fluid passage means and common exhaust duct means therein, said fluid passage means each having radiused lip fluid inlet means and cylindrical throat means and frusto-conically flared fluid expansion chamber means, said radiused lip fluid inlet means being coaxial and contiguous with and connected to said cylindrical throat means, said cylindrical throat means being coaxial and contiguous with and connected to said frusto-conically flared fluid expansion chamber means, said common exhaust duct means of said eductor means being contiguous with and connected to said fluid passage means, said common exhaust duct means forming a fluid flow path parallel to and coplanar with said fluid passage means, said common exhaust duct means having a substantially constant area cross-section normal to and along said fluid flow path, and said common exhaust duct means having an elongated configuration with parallel sides and arcuate ends in cross-section at the intake end thereof and having a circular configuration at the exit end thereof.

3. An eductor comprising, means forming a plurality of parallel fluid passage means and common exhaust duct means therein, said fluid passage means each having fluid inlet lip means and throat means and fluid expansion chamber means, said fluid inlet lip means being coaxial and contiguous with and connected to said throat means, said throat means being coaxial and contiguous with and connected to said fluid expansion chamber means, said common exhaust duct means of said eductor means being contiguous with and connected to said fluid passage means, said common exhaust duct means forming a fluid flow path parallel to said fluid passage means, and said intake end and said exit end of said common exhaust duct means having cross-sections normal to the fluid flow path of equal areas.

4. An eductor comprising, means forming fluid passage means and common exhaust duct means therein, said fluid passage means having fluid inlet lip means and throat means and fluid expansion chamber means, said fluid inlet lip means being contiguous with and connected to said throat means, said throat means being contiguous with and connected to said fluid expansion chamber means, said common exhaust duct means of said eductor means being contiguous with and connected to said fluid passage means, said common exhaust duct means forming a fluid flow path from said fluid passage means, and said intake end and said exit end of said common exhaust duct means having cross-sections normal to the fluid flow path of equal areas.

5. An ejector pump comprising, ejector means, and eductor means forming a plurality of fluid passage means and common exhaust duct means therein, said fluid passage means each having fluid inlet means and cylindrical throat means and frusto-conically flared fluid expansion chamber means, said fluid inlet means being coaxial and contiguous with and connected to said cylindrical throat means, said cylindrical throat means being coaxial and contiguous with and connected to said frusto-conically flared fluid expansion chamber means, said common exhaust duct means of said eductor means being contiguous with and connected to said fluid passage means, said common exhaust duct means forming a single common fluid flow path with said plurality of fluid passage means of constant cross-sectional area normal to the flow path therethrough substantially throughout the length thereof, said ejector means having fluid conduit means and manifold means and a plurality of nozzle means, said fluid conduit means being connected to said manifold means for conducting fluid to said manifold means, said plurality of nozzle means being connected to said manifold means, one of said nozzle means being coaxially aligned with and disposed in each one of said plurality of eductor fluid passage means, and the tip of each said nozzle means extending the length of said fluid inlet means thereof and terminating at the beginning of said cylindrical throat means thereof.

References Cited by the Examiner

UNITED STATES PATENTS

| 1,182,460 | 5/1916 | Cruger | 103—262 X |
| 1,879,366 | 9/1932 | Lorraine. | |

FOREIGN PATENTS 337,587  6/1921  Germany.

MARK NEWMAN, *Primary Examiner.*

WARREN E. COLEMAN, *Examiner.*